Figure 1:
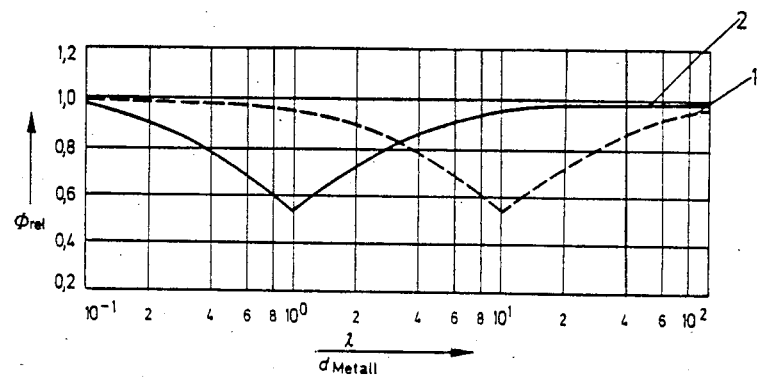

United States Patent [19]

Greiner et al.

[11] Patent Number: 4,578,280
[45] Date of Patent: Mar. 25, 1986

[54] PROCESS FOR THE PRODUCTION OF A MAGNETIC RECORDING MATERIAL WITH PERPENDICULAR ORIENTATION

[75] Inventors: Joachim Greiner, Ebenhausen; Burkhard Nippe, Munich, both of Fed. Rep. of Germany

[73] Assignee: Agfa-Gevaert Aktiengesellschaft, Leverkusen, Fed. Rep. of Germany

[21] Appl. No.: 583,727

[22] Filed: Feb. 27, 1984

[30] Foreign Application Priority Data

Mar. 8, 1983 [DE] Fed. Rep. of Germany ....... 3308052

[51] Int. Cl.⁴ .............................................. B05D 3/14
[52] U.S. Cl. ...................... 427/47; 427/48; 427/130
[58] Field of Search ............... 427/47, 48, 130; 428/692, 694, 900

[56] References Cited

U.S. PATENT DOCUMENTS

| | | | |
|---|---|---|---|
| 3,131,078 | 4/1964 | Fuller et al. | 427/48 |
| 3,172,776 | 3/1965 | Manly | 427/48 |
| 3,627,580 | 12/1971 | Krall | 427/48 |
| 4,208,447 | 6/1980 | Bate et al. | 427/48 |
| 4,271,782 | 6/1981 | Bate et al. | 427/48 |
| 4,332,834 | 6/1982 | Takei | 427/48 |
| 4,451,502 | 5/1984 | Takada et al. | 427/48 |

FOREIGN PATENT DOCUMENTS

| | | | |
|---|---|---|---|
| 1118483 | 11/1961 | Fed. Rep. of Germany | 427/47 |
| 0009905 | 1/1979 | Japan | 427/48 |
| 0011704 | 1/1979 | Japan | 427/48 |
| 154656 | 9/1982 | Japan | 428/900 |
| 1416200 | 12/1975 | United Kingdom | 427/48 |

Primary Examiner—George F. Lesmes
Assistant Examiner—William M. Atkinson
Attorney, Agent, or Firm—Connolly and Hutz

[57] ABSTRACT

This invention relates to a process for the production of a magnetic recording material having at least one layer of magnetic oxidic and/or metallic needle shaped pigments with dimensional anisotropy and/or some other type of magnetic anisotropy, e.g. crystalline, dielectric or magnetic field induced anisotropy, which process may be used to produce a layer having perpendicular anisotropy or a layer which passes from an initial perpendicular anisotropy to an isotropic distribution of the preferential magnetic axes of the pigments. According to the present process, the magnetic dispersion, after having been applied to the layer support, is subjected to an external magnetic field while still in the state of a liquid suspension, with the result that the pigments move with the preferential axis thereof into the perpendicular axis of the layer, and the pigments are subsequently fixed by drying.

13 Claims, 11 Drawing Figures

PROCESS FOR THE PRODUCTION OF A MAGNETIC RECORDING MATERIAL WITH PERPENDICULAR ORIENTATION

This invention relates to a process for the production of a magnetic recording material having at least one layer consisting of magnetic pigments embedded in binder, the recording material having a preferential magnetic axis perpendicular to the surface of the layer or a layer structure derived therefrom in accordance with the present process.

The first known magnetic recording materials of technical importance consisting of binder with embedded magnetic pigments were magnetically isotropic layers. cubic iron oxide particles dispersed in a binder were applied to a support, using a casting device which did not contain magnetic elements.

Elongated pigment particles which become orientated by a magnetic field during the casting process have been in use since the '50's for the purpose of increasing the storage density. A magnetic storage layer having a preferential axis in the direction of travel of the tape is obtained. These layers were found satisfactory for two to three decades since the recorded half wave lengths were invariably greater than the thicknesses of the layers.

With the necessity of fixing magnetic impulses and signals in the 1 $\mu$m region, some interest developed in the use of recording materials having the preferential magnetic axis thereof perpendicular to the surface. Such a layer is described in DP 1,258,146 (08.12.64).

It has also been disclosed in "Internationale Elektronische Rundschau" 1970, No. 10, pages 251-255, sketch 5 (see FIG. 1) that the preferential direction perpendicular to the surface of the layer is advantageous for the recording of short wave lengths. FIG. 1 shows the dependence of the remanent band flux upon the wave length $\lambda/d_M$ for an oxidic (----1) and a metallic (——2) storage layer as recited in the article. The hysteresis loop of the flux was assumed equal in the two layers. The layer thickness of the metal band ($d_M$) is thus approximately only one-tenth of the thickness of the oxide band ($d_O$). With long wave lengths ($\lambda$), where $\lambda > d$ (d=layer thickness), an isotropic magnetic layer is always magnetized in the longitudinal direction since this condition is more favourable from an energy point of view owing to the demagnetizing field. As the wave length $\lambda$ decreases, the ratio d:$\lambda$ increases and hence the remanent magnetization decreases owing to the shearing of the hysteresis loop. If, finally, the half wave length becomes equal to the layer thickness d ($\lambda/2=d$), the direction perpendicular to the surface of the band begins to become equally important and, with further reduction of the wave length, it becomes energetically more favourable so that the magnetization lies preferentially in the direction of the perpendicular. The remanent flux $\phi$ now begins to rise again. In the drawing, the wave length refers to the layer thickness of a metal band $d_M$ (approximately 0.3 $\mu$m).

Iwasaki has in recent years described the vertical recording on metallic layers, in particular on CoCr layers, inter alia in "Magnetic medium for perpendicular recording". Proceedings of 1982 Sendai Symposium on Perpendicular Magnetic Recording, March 11-12, pages 1-30, Lecture No. 15, Research Institute of Electrical Communication, Sendai, Japan, and in "An analysis for the Magnetization mode for High Density Magnetic Recording" (IEEE Transaction of Magnetics, Volume on MAG 13, No. 5, 1977, pages 1272-77).

These metal layers have a preferential magnetic axis in the direction of the perpendicular to the surface of the recording material. The technology of the production of metal layers is, however, still in its infancy, while the technology of the production of oxide layers has generally been perfected to a high degree. The obvious idea of orientating the preferential axis of the magnetic pigments by a constant field which acts on the still liquid pigment dispersion during the production process is described in DE-OS No. 3,148,769 for pigments having a length/width ratio of less than 3:1. This limitation shows that the process still has considerable deficiencies. One particular disadvantage is the abrupt fall in temperature employed for solidifying the liquid dispersion, since this has a deleterious effect on the homogeneity of the layer. Another disadvantage is that due to the constant field directed perpendicularly to the still liquid storage layer, there is formed an extremely powerful de-magnetizing field opposing the constant field in the layer. The effective field is thereby made much weaker and the perpendicular orientation more difficult.

DE-OS No. 3,217,211 describes another process for the production of a magnetic anisotropy perpendicular to the surface of the layer. To assist the perpendicular orientation by a constant field, the magnetic pigment is in this case subjected to a heat treatment in the magnetic field. The powder may be exposed to this thermomagnetic treatment either before or after its application to the layer support in the constant field. The above-mentioned reference also has the disadvantage that, when the pigments are orientated in the constant field, this field is opposed by a high demagnetizing field. To this is added the difficulty that the thermomagnetic treatment of the pigments on the foil requires a high degree of thermal stability of the layer support. Another disadvantage is the large amount of time consumed for the thermomagnetic process.

It is therefore an object of the present invention to provide a process for the production of a magnetic recording material having at least one layer of magnetic oxidic and/or metallic needle-shaped pigments with dimensional anisotropy and/or some other form of magnetic anisotropy, e.g. crystalline anisotropy, dielectric anisotropy or magnetic field induced anisotropy, which process may be used to produce a layer having perpendicular anisotropy or a layer initially having perpendicular anisotropy and finally having isotropic distribution of the preferential magnetic axis of the pigments. The process should in particular be suitable for producing the following structures:

(1.) Layers in which the magnetic preferential axis of the particles extends in the direction of the perpendicular to the layer and which may be obtained without the above-mentioned disadvantages.
(2.) Production of spatially isotropic layers from pigments having a preferential magnetic axis.
(3.) Production of layers having a 2-dimensional statistic distribution of the preferential magnetic axis of the particles parallel to the plane of the layer.
(4.) Production of layers having a 2-dimensional statistic distribution of the preferential magnetic axis of the particles, with the plane of distribution extending perpendicularly to the plane of the layer and in the direction of the storage track.

The problem is solved according to the present invention by a process for the production of a magnetic recording material having at least one layer of magnetically anisotropic pigments dispersed in a binder. After the magnetic dispersion has been applied to the layer support it is subjected while in the state of a liquid suspension to an external magnetic field acting substantially parallel to the perpendicular of the layer, with the orientation of the field constantly changing in the direction of casting by 180° with simultaneous reduction in the strength of the field so that the pigments turn with the preferential axis thereof into the perpendicular axis of the layer and form spatially small regions of reduced scatter field energy due to the demagnetization or extinction effect and the pigments are subsequently fixed by drying.

Figure 3:
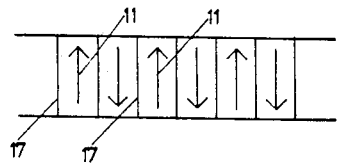

The demagnetization energy of the storage layer is thus substantially reduced. FIG. 3 shows such small regions of alternating direction of magnetization 11 and the partitions 17.

According to the present invention, the various structures of the layers are obtained by shifting the drying point of the layer with respect to the directional field and if necessary by providing an additional field component in the direction of recording. The following production methods are thus available:

For the production of layers in which the preferential magnetic axis should be in the direction of the perpendicular to the layer, the layer is left to solidify in the magnetic field arrangement according to the present invention.

For the production of spatially isotropic layers of magnetic particles having a preferential magnetic axis there are two possibilities.

The drying point is placed where the wet layer runs into the magnetic arrangement so that a spatially isotropic distribution of the preferential axes of the particle is achieved by the fact that only a proportion of the preferential axes are turned to some extent into the perpendicular of the layer. The drying point is placed where the wet layer leaves the magnetic arrangement according to the present invention. The particles which were placed perpendicularly in the magnetic arrangement fall apart and at that moment they are fixed with varying degrees of deviation from the perpendicular.

For the production of layers having a 2-dimensional statistical distribution of the preferential magnetic axes parallel to the plane of the layer, the drying and fixing point is situated far away from the directional arrangement. The wet layer passes through the arrangement according to the present invention for orientating the particles perpendicularly to the layer. The particles then fall over like Mikado sticks and lie statistically distributed parallel to the surface of the layer.

Figure 2:
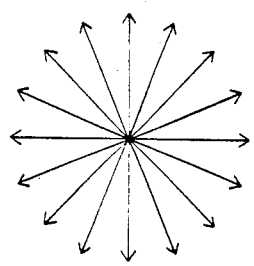

FIG. 2 shows the stellate, two-dimensional statistical distribution of the preferential magnetic axes of the particles of the layer.

For the production of layers having a two dimensional distribution of the preferential magnetic axes, with the plane of distribution perpendicular to the plane of the layer and in the direction of the storage track, drying is carried out in a magnetic field arrangement according to the present invention, but the arrangement has an additional field component in the direction of travel of the band, the additional component not amounting to more then one-quarter of the perpendicular component.

According to the present invention, the process is not limited to particular magnetic materials of the pigments, but is applicable, for example, to the various magnetic pigments known today, such as $Fe_3O_4$, $\gamma$-$Fe_2O_3$, berthollide, $CrO_2$, metal powder, barium ferrites and rare earth metals.

In addition to the ferromagnetic pigments, the magnetic layer contains binders, solvents and other additives, such as dispersing agents, lubricants and wetting agents. The binders used are the coventional, high molecular weight resins, such as polyvinyl compounds, polyesters, polyurethanes, cellulose derivatives and the like. The layer supports consist of flexible or rigid materials, such as PET, polyolefins, cellulose derivatives, non-magnetic metals, such as aluminium, or ceramic materials, such as glass.

The present invention also includes the combination of types of layers obtainable by this process as described above, with each other and with other types of layers, other coercive fields and/or other types of anisotropy. These combinations belong to two different groups: multiple layers for improved utilisation of recording and scanning devices, and multiple layers in which each layer is the carrier of a different information, e.g. speech and music.

Of particular importance are multiple layers which reproduce the split field of a ring head. The upper layer in direct contact with the head mirror is always a layer according to the present invention having a preferential axis in a direction perpendicular to the plane of the layer. The following are used as lower layers:

(a) Layers having a preferential magnetic axis in the direction of travel of the band. These may consist of orientated pigment layers, e.g. layers of $\gamma$-$Fe_2O_3$, $Fe_3O_4$, $CrO_2$, metal powders or homogeneous metal layers. The coercive field $H_{CU}$ lies between the perpendicular layer $H_{CS}$ and a $\frac{1}{4}$ thereof.

(b) Soft magnetic, isotropic layers with low coercive fields which close the magnetic flux of the recording. Pigment and metal layers may also be used for this purpose.

Figure 4:
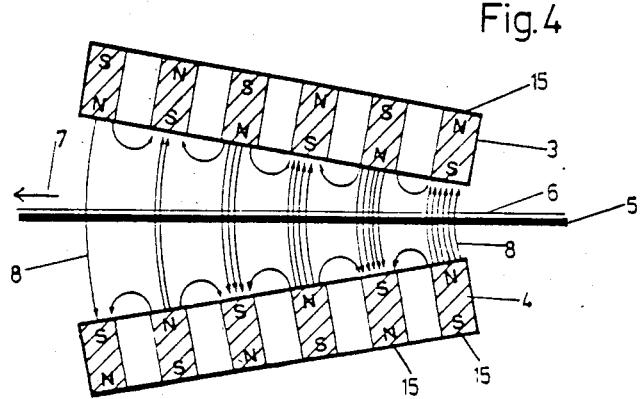

There are various methods of enabling a magnetic field according to the present invention to act in an axis perpendicular to the storage layer during the production process. Some of these methods are exemplified below:

Arrangements of permanent magnets have the advantage of dispensing with costly methods of preventing explosions of the solvent mixture of the casting lacquer during production of the recording material. FIG. 4 illustrates the principle of such an arrangement. The arrangement consists of two equal chains of magnets (15) which will be referred to as magnet carpets (3,4). These magnet carpets lie symmetrically to the foil (5) on which lies the still liquid layer (6). The direction of movement of the foil is indicated by the arrow (7). The north poles (N) and south poles (S) of the carpets (3,4) are always situated opposite each other so that magnetic fields (8) are formed in alternating directions perpendicularly to the foil (5) and layer (6), i.e. perpendicularly to the line of symmetry. The strength of the fields of the line of symmetry decreases in the direction (7) in which the still liquid layer moves through the magnetic arrangement. When setting up the magnetic carpets, care should be taken to ensure that the field (8) provided for orientation and demagnetization decreases monotonously as uniformly as possible.

One means of achieving this is to concentrate on the accuracy of production as the most important factor in construction. The many individual parts of the individual circuits required are produced with the identical dimensions and magnetic values. The reduction in the field along the line of symmetry is then achieved by positioning the two identical magnetic circuit arrangements so that they diverge in the form of a wedge, as shown in FIG. 4. In certain cases, a low longitudinal component is required, which may be obtained by slightly shifting the two magnetic carpets (3,4) in the direction of displacement (7) or by displacing the layer support slightly outside the line of symmetry between the two chains of poles.

The problem could also be solved by concentrating on obtaining the optimum field geometry for the whole path of orientation and demagnetization.

Figure 5:
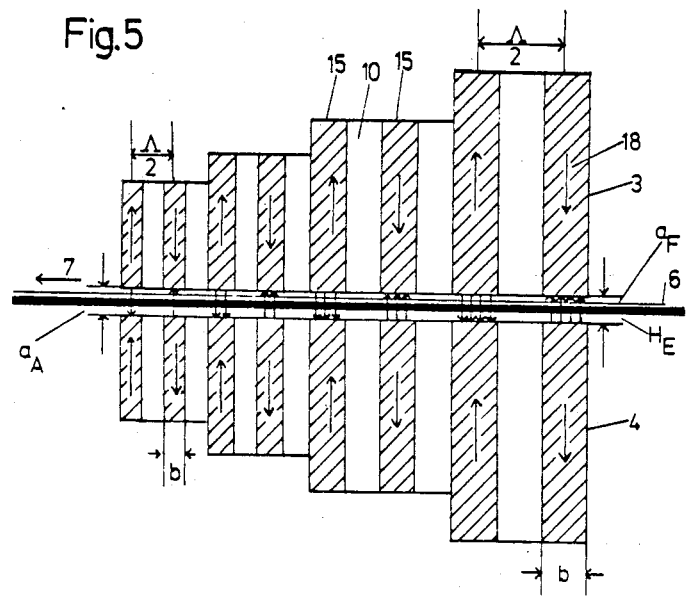
Figure 6:
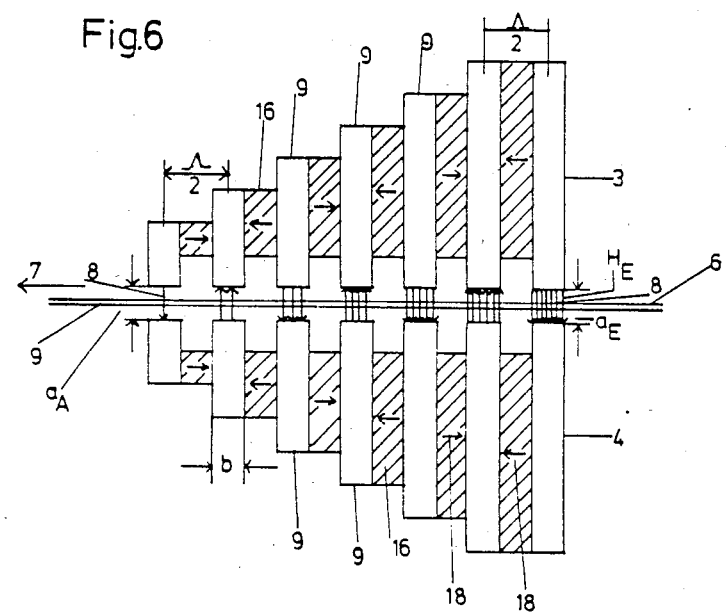
Figure 7:
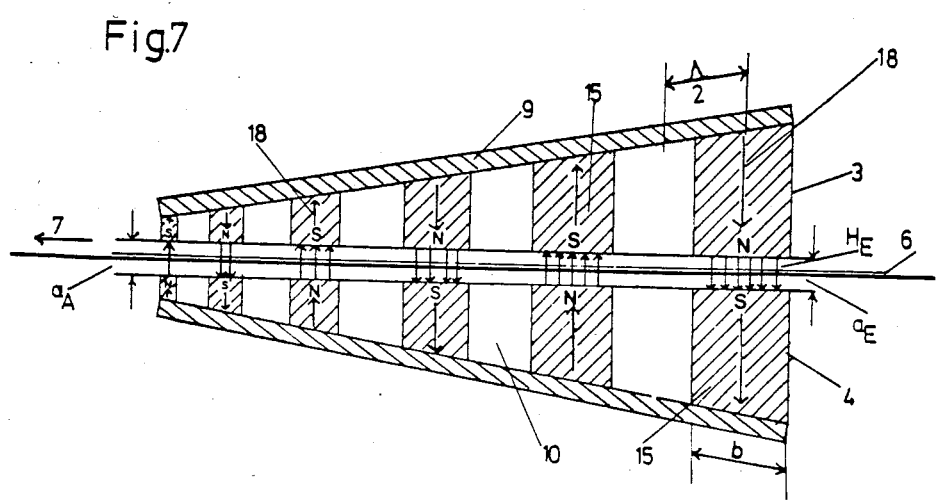

Such is exemplified in FIGS. 5 to 7. One of the principles for obtaining the optimum field geometry is that the field strength $H_E$ should be as high as possible at the entrance of the layer (6) into the magnetic carpet arrangement (3,4). The distance $a_E$ between the two magnetic carpets (3,4) should be as small as possible at the entrance. The mechanical means of guiding and supporting and the behaviour of the lacquer impose a lower limit on this distance. The width of the poles at the entrance may be slightly increased so as to increase the intensity of the field (FIGS. 5, 7).

The converse relationships apply at the exit of the layer from the magnetic arrangement (3,4). The distance between the poles of a chain ($\lambda/2$) should here be as small as possible (FIGS. 5, 7) in order that the spatially smallest possible magnetic regions may form in the layer. If, however, the distance $\lambda/2$ is too greatly reduced, the scatter field will not be able to reach the opposite pole with the necessary intensity, but will give preference to the pole situated to the right and left thereof. The distance $a_A$ must therefore be kept as small as possible in the same way as at the entrance. The lower limit to this distance is again determined by the means for supporting and guiding the foil and the characteristics of the lacquer, so that the optimum is generally found to be a constant distance of $a = a_E = a_A$.

Another factor for obtaining the optimum field geometry is that the leakage field of the whole arrangement of magnetic carpets (3,4) should not interfere with the monotonous, periodic decrease of the obliterating field towards the exit of the layer (6) (FIGS. 5, 6, 7, 10), i.e. so that the point of contact of the lines of field of the total leakage field of the arrangement will be distributed over the whole length of the magnetic carpets (3,4).

To summarize the various factors for obtaining the optimum field geometry, the distance (a) between the two magnetic carpets (3,4) should be as small as possible from beginning to end and remain constant (1-3 mm). The magnetic energy made available by the magnets should decrease from beginning to end, i.e. the magnetic volume should progressively decrease.

The magnetic circuits may be built up of bar magnets and/or block magnets. Magnetic materials with high coercivity and high energy product, such as barium ferrite and rare earth magnets, are preferred. Block magnets (16) of barium ferrite (FIG. 6) are frequently magnetized over the axis of the short dimension (arrow 18) and used in combination with soft magnetic material (9) having a high saturation magnetization. FIG. 6 illustrates one example in which the reduction in field (8) is obtained by reducing the area of contact between the hard and the soft magnetic material. With a similar arrangement, the dimensions b and $\lambda/2$ could also be reduced in the direction of travel of the storage layer.

Magentic carpets using rare earth magnets would be constructed differently owing to the high energy product of this material. A sketch is given in FIG. 7. The bar magnets 15 of CoSm are directed with the preferential magnetic axis thereof 18 perpendicularly to the layer 6. The volume thereof (depth and length) decreases in the direction of the arrow (7). A soft magnetic flux conductor (9) at the back serves to reduce the demagnetization factor of the individual magnetic circuits. Non-magnetic filling material (10) is provided between the magnets (15).

When electromagnetic systems are employed, these must usually be provided with costly artificial ventilation during the casting process in order to prevent explosions. On the other hand, they have the advantage that the fields may easily be altered by altering the current and may thereby be adapted to the given conditions of the pigments and dispersions.

Figure 8:
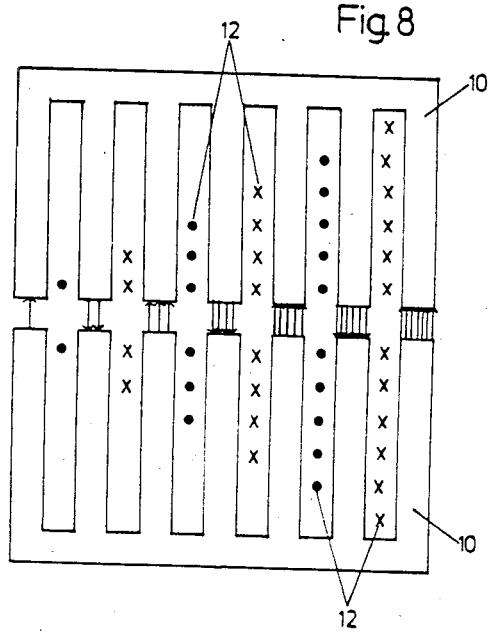

Construction and production of electromagnetic systems are based on those of electric motors, especially linear motors. In principle, they again comprise two chains of magnetic circuits, as in the permanent magnetic systems. This results in a structure of two combs of soft magnetic material 10 (FIG. 8) having grooves in which the current-carrying wires (12) are inserted. One method of making the current in the individual grooves and hence the operative field variable consists of arranging electric resistances between the teeth of the combs and connecting them in parallel to the coils. The number of current conducting wires (12) may also be varied, as shown in FIG. 8.

Arrangements have been described in which orientation of the particles is achieved by a diminishing field perpendicular to the surface of the band and alternating in direction.

The present invention also includes the feature that the perpendicular positioning of the particles is obtained by additional devices to improve the results. These additional devices have the following effects:

Orientation of the particles in the direction of travel of the band before the entry thereof into the magnetic arrangement described so far, closer approach to the perpendicular position before entry of the particles in the magnetic arrangement described so far.

These devices may be placed singly or in combination in front of the magnetic carpet arrangements (3,4).

Orientation of particles in the direction of travel of a tape is known and will therefore not be described in detail. It is frequently achieved by using the magnetic field of two like poles situated opposite each other. The foil is passed between the poles on the line of symmetry.

Placing the particles upright or bringing them closer to the perpendicular position is achieved (FIG. 9) by passing the foil (5) covered with the liquid layer (6) directly over a gap (13) from 0.1 to 1 mm in width of a magnetic circuit 14 composed of permanent magnets 16 and soft magnetic flux conductors 9. From the lines of the magnetic field (8) indicated, it will be seen that at its exit, the layer (6) is subjected to a magnetic field substantially perpendicular to the surface of the band.

When layers are produced by the process according to the present invention, drying must be carried out to a higher standard of accuracy, but does not require basically different types of control sensors or construction principles than the conventional production of tapes. Drying of the wet magnetic layer in a counter current of air with accurate monitoring of the temperature is one method which has been tested. More accurate observance of the required temperatures and drying conditions may be achieved according to the present invention by using several different types of regulated air currents succeeding each other transversely to the direction of travel of the foil.

In one case, an air stream which is adjustable in temperature and velocity is blown against the direction of travel of the tape to solidify the dispersion on the layer support. The air stream may also be carried away perpendicularly to its direction of flow in the middle third of an alternating magnetic field arrangement so that the pigments are still highly mobile in the first third and the layer solidifies more firmly in the last third. The air stream may also be blown parallel to the plane of the layer but perpendicularly to the direction of travel. Those skilled in the art may easily ascertain by tests which is the most suitable method in an individual case.

Another method which has proved useful consists of heating or cooling the magnetic arrangement at the appropriate points by liquids, such as water, to produce the required drying areas.

One modern method is the use of Peltier elements for heating or cooling various areas of the magnetic arrangement.

Drying by radiation (UV radiation, infra-red radiation) is also known.

The foils may be guided through the magnetic arrangement by rollers or baffle plates or the principle of guiding in a floating state may be employed.

The assessment of the degree of perpendicularity will now be discussed. There are various method available.

Magnetic Measurements

To determine the position of the particles in a magnetic layer, the hysteresis loops of the layer are measured in three directions in space:

In the direction of travel of the tape (longitudinally), transversely to the direction of travel of the tape in the plane of the layer (transversely), and in a direction perpendicular to the surface of the tape (perpendicularly).

When the first two directions are employed, the external demagnetization factor may usually be set at zero if a suitable form of sample is used since the surface area of the layer is greater than its thickness.

Great difficulties are encountered when measuring in the perpendicular direction. The measuring field is required to magnetize the sample perpendicularly to the surface of the layer, with the result that a very large demagnetizing field is produced. The demagnetization factor amounts to 1 or $4\pi$, depending upon the system of measuring employed. Due to the powerful demagnetizing field, it is necessary to use very powerful fields (greater than 10,000 Oe) for magnetization. In the circumstances, a vibration magnetometer used in combination with a Weiss magneton has been found satisfactory.

For a tabulated comparison of the samples, it is in most cases sufficient to give the $B_r/B_s$ values and possibly also the coercive fields. In addition to magnetic measurements, microscopic and raster microscopic pictures also show differences between the surfaces of the different structures.

When the pigment is in the form of monocrystalline particles (e.g. $CrO_2$), the orientation may be determined by X-rays. This is the advantage of volumetric measurement.

Indirect information may also be obtained by storage technical measurements. Thus, the cast layer may be used as a floppy disc and the level fluctuations while playing the disc may be monitored. Three-dimensionally isotropic layers, layers which are isotropic in the storage plane and layers which have a perpendicular orientation do not manifest level fluctuations. Even minor fluctuations of level indicate layers of a different type.

Another storage technical test may be carried out in a home video. Only very short wave lengths are used in this case, so that the scanned level may be a good measure of the degree of perpendicularity obtained in the pigment.

Since the methods of measurement described above may still leave some room for doubt for assessing the perpendicularity, test samples are frequently compared with reference samples obtained from known sample material, e.g. samples having longitudinally directed pigment particles. Such sample material may be produced by using a suitable magnetic system during the casting process. This technique is well known.

Exemplary embodiments

The experiments were carried out with magnetic systems according to the present invention, using a conventional magnetic tape casting machine. The casting system used was a extrusion hopper in which the casting liquid is expressed through a slot against a roller. This system has no magnets on the casting apparatus and there is therefore no possibility of magnetic forces acting on the pigment particles. Due to the flow of liquid at the slot, the particles are slightly orientated in the direction of movement of the tape. The conventional means for controlling the ventilation and temperature were available for the drying process.

Magnetic systems according to the present invention

Two magnetic carpet systems according to the present invention will first be described:

First type (FIG. 10) of magnet carpet system produced from identical individual parts. The two magnetic carpets (3,4) consist of identical magnetic circuits arranged in a series. The strength of the fields acting on the layer is reduced by placing the magnetic carpets (3,4) obliquely. The individual magnet circuits consist of barium ferrite magnets 16 in the form of blocks measuring $3 \times 21 \times 50$ mm magnetized across the shortest edge. Magnets of this type are supplied, for example, by Edelstahlwerke Dortmund under the material reference 300 K. Rectangular rails of soft magnetic conductive material 9 measuring $3 \times 25 \times 200$ mm flank the barium ferrite blocks which are arranged like the bricks of a brick wall. The space 10 is filled with non-magnetic filling material. A sequence of a total of 50 north and south poles (N, S) was used. These magnetic circuits are mounted in non-magnetic material (not shown). The width of the inlet opening between the magnets is from 1.5 mm to 2.0 mm. The opening angle is variable for the purpose of optimizing the production conditions. The outlet opening may therefore be adjusted to values from 1.5 to 18 mm. The maximum field strength at the entrance to the arrangement was from 1,000 to 1,100 Oe.

Figure 11:
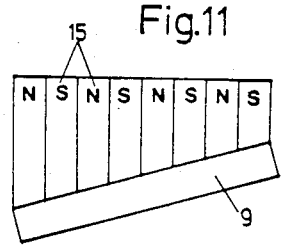

Second type (FIG. 11) using unequal magnets of CoSm and a soft magnetic backing layer. The basic arrangment of this type of magnetic carpet is shown in FIG. 5. In the embodiment exemplified (FIG. 11), the non-magnetic material between the "bar magnets" (15) could be omitted since CoSm has a sufficiently pronounced anisotropy. These bar magnets about 3 mm in width were placed on a soft magnetic flux conductor 9 having a thickness of 5 mm to reduce the demagnetization factor of the circuits. The bar magnets had an initial length of 10 mm decreasing to zero over a length of about 30 cm. When used in the casting machine, the useful magnetic surfaces were spaced from about 2 to 3 mm apart, but they could also be tilted towards each other.

Figure 9:
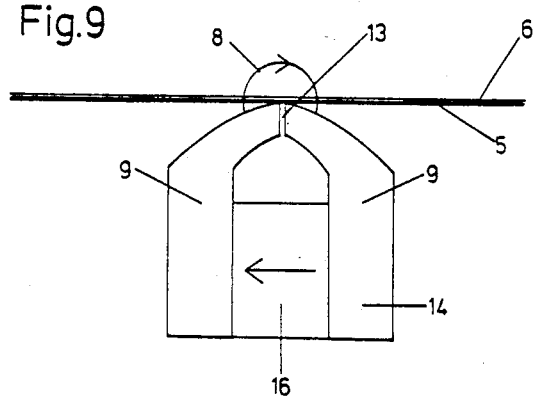
Figure 10:
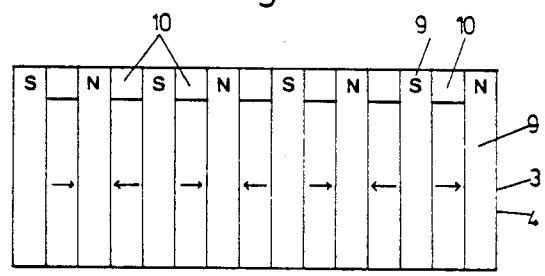

The additional magnets placed in front of the magnetic carpets (3,4) have the function according to the present invention of facilitating the perpendicular positioning. The pigment particles are first orientated longitudinally by means of two bars having the like poles thereof situated opposite each other. The maximum field acting in the direction of travel of the tape was 1,100 Oe. The basic principle of the split bars used for producing the perpendicular positioning is illustrated in FIG. 9. The permanent block magnet 16 had a cross-section of 3×23 mm and consisted of barium ferrite (300 K). The soft magnetic yoke 9 had a total height of 23 mm and total width of 10 mm. The gap between the two magnets placed one behind the other was 0.4 mm and 0.8 mm.

We claim:

1. A process for the production of a magnetic recording material having at least one layer comprised of magnetically anistropic pigments dispersed in a binder comprising the steps of casting a magnetic dispersion of pigments in liquid suspension in a layer on a support, subjecting said magnetic dispersion in liquid suspension to an external magnetic field positioned longitudinally of said cast layer and which acts in a direction substantially perpendicular of the cast layer, displacing the cast layer and magnetic field longitudinally with respect to each other, repeatedly alternating the orientation of said field by 180° and reducing the field strength in the direction of casting of the layer so that the pigments turn with the preferential axis thereof into the perpendicular axis of the layer and form spatially small regions of reduced stray field energy as a result of the demagnetization or obilteration effect and the pigments are subsequently fixed by drying.

2. Process according to claim 1, characterised in that additional fields are placed in front of the alternating field, these additional fields orienting the preferential axis of the pigment in the direction of travel of the tape or in the position perpendicular to the plane of the tape.

3. Process according to claims 1 or 2, characterised in that the preferential magnetic axes are fixed in the position perpendicular to the storage layer by causing the drying of the layer to take place in the region of the alternating field.

4. Process according to claims 1 or 2, characterised in that the preferential axes of the pigments are first turned in to the perpendicular of the layer by an external magnetic field, but the layer leaves the region of the alternating field while still in the liquid state so that the particles subsequently drop into the plane of the layer in a two-dimensional statistical distribution as confined by said plane and are subsequently fixed by drying.

5. Process according to claims 1 or 2, characterised in that the preferential axes of the particles are first turned in to the perpendicular to the layer by an external magnetic field, and the wet layer is dried immediately on leaving the region of the alternating field so that, as the particles fall over, they assume different angles of inclination to the perpendicular of the layer from 0° to 90° so that a three dimensional statistical distribution of the preferential axes of the pigments results.

6. In the process of claim 2 the step of partial orientation in the longitudinal direction of said applied layer effected by a magnetic field produced by two like poles placed opposite to each other and passing the layer between the poles.

7. In the process of claim 2 the step of partial orientation in the perpendicular position of the pigment is acheived by the gap of several yoke magnets, the direction of the field in the gaps alternating successively.

8. Process according to claim 1 or 2, characterised in that the layer is oriented parallel to the film direction by means of a first magnetic field by two like poles placed opposite each other immediately after it has been applied to the layer support, and is then carried into the alternating magnetic field which acts in a direction substantially perpendicular to the applied layer, whereby a two-dimensional statistical distribution of the preferential axes of the pigments results in the plane determined by the perpendicular to the layer and the direction of travel of the tape.

9. Process according to claims 1 or 2, characterised in that the alternating field comprises unlike poles placed opposite each other and in that the layer passes through the magnetic centre of the arrangement.

10. Process according to claim 9, characterised in that reduction of the field is obtained by the distance between the unlike poles placed opposite each other increasing from the entrance of the layer to the exit of the layer.

11. Process according to claim 9, characterised in that the magnetic volume of the permanent magnets avaliable for producing the field decreases for the individual magnetic circuits from the entrance of the layer to the exit of the layer from the magnetic arrangement.

12. A process for the production of a magnetic recording material having at least one layer comprised of magnetically anistropic pigments dispersed in a binder comprising the steps of casting a magnetic dispersion of pigments in liquid suspension in a layer on a support, subjecting said magnetic dispersion in liquid suspension to an external magnetic field positioned longitudinally of said cast layer and which acts in a direction substantially perpendicualr to the cast layer, displacing the cast layer and magnetic field longitudinally with respect to each other, repeatedly alternating the orientation of said field by 180° and reducing the field strength in the direction of casting of the layer so that the pigments turn with the preferential axis thereof into the perpendicular axis of the layer and form spatially small regions of reduced stray field energy as a result of the demagnetization or obilteration effect and drying the layer as the layer enters the region of alternating field, whereby the particles are fixed at various angles of inclination from 0° to 90° as they stand up from a possible preferential direction, and a three dimensional statistical distribution of the preferential axes of the pigments is obtained.

13. Process according to claim 12, characterised in that the alternating field acting perpendiculary to the layer is supplemented by an additional field component in the direction of the tape, the amount of which does not surpass 5 to 25% of the amount of the alternating field acting perpendicular to the layer, so that a two-dimensional statistical distribution of the preferential axes of the pigments is obtained in the plane determined by the perpendicular to the layer and the direction of the movement of the tape, and drying of the layer takes place within this alternating field.

* * * * *